US010921194B2

(12) United States Patent
Myer et al.

(10) Patent No.: US 10,921,194 B2
(45) Date of Patent: Feb. 16, 2021

(54) ELECTRICAL CONTACT THERMAL SENSING SYSTEM

(71) Applicant: TE CONNECTIVITY CORPORATION, Berwyn, PA (US)

(72) Inventors: Nathan Philip Myer, Lancaster, PA (US); Zachary Wood Lyon, Lewisville, NC (US); David Bruce Sarraf, Elizabethtown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 233 days.

(21) Appl. No.: 16/126,219

(22) Filed: Sep. 10, 2018

(65) Prior Publication Data

US 2020/0080901 A1    Mar. 12, 2020

(51) Int. Cl.
| | | |
|---|---|---|
| *G01K 13/00* | (2006.01) | |
| *G01K 5/72* | (2006.01) | |
| *B60L 53/14* | (2019.01) | |
| *H01H 71/08* | (2006.01) | |

(52) U.S. Cl.
CPC ............... *G01K 5/72* (2013.01); *B60L 53/14* (2019.02); *G01K 13/00* (2013.01); *H01H 71/08* (2013.01)

(58) Field of Classification Search
CPC .......... G01K 5/16; G01K 11/06; G01K 13/00; H05B 1/0211; G01N 33/0027
USPC .......................................................... 116/216
See application file for complete search history.

(56) References Cited

U.S. PATENT DOCUMENTS

| 4,179,679 A | * | 12/1979 | Houghland | .......... | H01H 37/766 337/407 |
|---|---|---|---|---|---|
| 4,281,309 A | * | 7/1981 | Olson | ................... | H01H 37/765 29/623 |
| 4,401,965 A | * | 8/1983 | Backlund | ............. | H01H 37/765 337/407 |
| 5,492,482 A | * | 2/1996 | Lockman | ................. | G01K 7/12 439/329 |
| 10,502,633 B2 | * | 12/2019 | Nichols | ............... | H01H 1/0015 |
| 2010/0208768 A1 | | 8/2010 | Lakner et al. | | |
| 2012/0212179 A1 | | 8/2012 | Nathan et al. | | |

(Continued)

FOREIGN PATENT DOCUMENTS

| CN | 209197913 U | * | 8/2019 |
|---|---|---|---|
| CN | 209326827 U | * | 8/2019 |
| DE | 202018002686 U1 | | 7/2018 |

OTHER PUBLICATIONS

International Search Report, International Application No. PCT/IB2019/057582, International Filing Date, Sep. 9, 2019.

*Primary Examiner* — Gail Kaplan Verbitsky

(57) ABSTRACT

A thermal sensing system includes an electrical contact, a sensing element, and a position sensor. The electrical contact includes a shaft that defines a channel. The channel extends into the shaft from an opening along an outer surface of the shaft. The sensing element is disposed at least partially outside of the channel and is operably connected to the channel through the opening. The sensing element is movable relative to the electrical contact based on a temperature change within the channel. The position sensor is spaced apart from the electrical contact and the sensing element. The position sensor is configured to detect a position change of a portion of the sensing element outside of the channel responsive to the temperature change within the channel.

23 Claims, 9 Drawing Sheets

(56) References Cited

U.S. PATENT DOCUMENTS

| | | | |
|---|---|---|---|
| 2013/0043230 A1* | 2/2013 | Schwarzbach | H05B 1/0213 219/202 |
| 2013/0303031 A1* | 11/2013 | Inagaki | H01R 13/5833 439/694 |
| 2013/0336359 A1* | 12/2013 | Zink | G01K 7/023 374/152 |
| 2014/0342590 A1* | 11/2014 | Al-Anzi | H01R 31/065 439/159 |
| 2017/0077693 A1* | 3/2017 | Lermann | H01R 31/065 |
| 2019/0326762 A1* | 10/2019 | Zoon | B60L 53/14 |

* cited by examiner

ELECTRICAL CONTACT THERMAL SENSING SYSTEM

BACKGROUND

The subject matter herein relates to thermal sensing systems that monitor a temperature of electrical contacts within electrical devices, such as, but not limited to, electric vehicle charging devices.

Electric vehicles, including fully electric and plug-in hybrid vehicles, have electrical charging systems for charging batteries that provide current used to propel the vehicles. The charging systems include a charging inlet on the vehicle that releasably couples to a mating connector connected to an external power source. Because the vehicle is immobilized during charging operations, there is a desire to reduce the duration of charging operations to reduce the amount of time that the vehicle is immobile. The charging duration can be reduced by increasing the rate of power (e.g., electric current) transfer. During high current charging, the electrical contacts of the charging inlet generate heat due to electrical contact resistances. If left unchecked, the heat can damage the components of the charging system and could potentially start a fire.

To prevent heat-related damage and fire, some known charging systems have temperature sensors for monitoring the temperature within the charging devices. The charging systems are programmed to derate (e.g., slow or potentially stop) the power transfer during the charging operation if the measured temperature exceeds a designated threshold. The decreased power transfer rate reduces the amount of heat generated to enable maintaining the temperature at a safe level that is unlikely to cause damage. However, the temperature sensors in known charging devices may be inaccurate and/or have a delayed response times, which reduces the efficacy of the sensors. For example, to prevent electrical arcing or other interference from the high power charging circuit to the low power temperature sensing circuit, known charging devices attempt to electrically isolate the temperature sensors and associated circuitry from the charging circuit by positioning the sensors relatively far away from the electrical power contacts and/or behind walls or other intervening structures. But, the separation distance and intervening structures result in a significant temperature gradient between the electrical power contacts and the temperature sensors, reducing the sensitivity of the sensors and slowing the response time. As a result of the low sensitivity and slow response time, known charging systems have limited control over the charging operation.

A need remains for a thermal sensing system that can more accurately and quickly monitor the temperature of electrical contacts of an electrical device.

SUMMARY

In one or more embodiments of the present disclosure, a thermal sensing system is provided that includes an electrical contact, a sensing element, and a position sensor. The electrical contact includes a shaft that defines a channel. The channel extends into the shaft from an opening along an outer surface of the shaft. The sensing element is disposed at least partially outside of the channel and is operably connected to the channel through the opening. The sensing element is movable relative to the electrical contact based on a temperature change within the channel. The position sensor is spaced apart from the electrical contact and the sensing element. The position sensor is configured to detect a position change of a portion of the sensing element outside of the channel responsive to the temperature change within the channel.

In one or more embodiments, a thermal sensing system is provided that includes an electrical contact, a sensing element, and a working material. The electrical contact includes a shaft that defines a channel. The channel extends into the shaft from an opening along an outer surface of the shaft. The sensing element is disposed at least partially outside of the channel and is operably connected to the channel through the opening. The sensing element is movable relative to the electrical contact. The working material is within the channel of the shaft. The working material has a temperature-dependent expansive property. The working material exerts a force on the sensing element to move the sensing element in a direction away from the channel in response to a temperature increase within the channel.

In one or more embodiments, a thermal sensing system is provided that includes an electrical contact, a metallic sensing element, and a position sensor. The electrical contact includes a shaft. The shaft defines a channel that extends into the shaft from an opening along an outer surface of the shaft. The metallic sensing element protrudes through the opening. The metallic sensing element has an interior segment disposed within the channel and an exterior segment disposed outside of the channel. The exterior segment moves relative to the electrical contact from a first position to a second position in response to a temperature of the interior segment of the metallic sensing element exceeding a designated threshold temperature. The position sensor is spaced apart from the electrical contact and the metallic sensing element. The position sensor is configured to detect a position change of the exterior segment of the metallic sensing element from the first position to the second position.

DETAILED DESCRIPTION

One or more embodiments of the present disclosure are directed to a thermal sensing system that monitors a temperature of an electrical contact. The thermal sensing system monitors the temperature of the electrical contact indirectly by detecting physical movement of a movable sensing feature that is caused by the temperature of the electrical contact. The thermal energy of the electrical contact is converted to mechanical energy that causes the movement of the sensing feature which is coupled to the electrical contact. A sensor is utilized to detect a change of position and/or movement of the sensing feature. The movement of the sensing feature can be calibrated with the temperature of the electrical contact. For example, the sensing feature may not achieve a first designated position until the temperature of the electrical contact is at or above a known temperature. Therefore, the receipt of sensor data demonstrating that the sensing feature is in the preset position indicates that the temperature of the electrical contact is at or above the known temperature.

The thermal sensing system described herein may be utilized as a stimulus (or trigger) for automatically taking one or more actions. For example, in response to detecting that the temperature of the electrical contact exceeds the known temperature (based on sensor data showing the sensing feature at the first designated position), a control device operably connected to the sensor may alter an electric current rate conveyed along the electrical contact actuate an electrical switch to reduce the temperature of the electrical contact. The thermal sensing system provides various benefits over the use of conventional temperature sensors to monitor the temperature of electrical contacts, as described herein.

Figure 1:
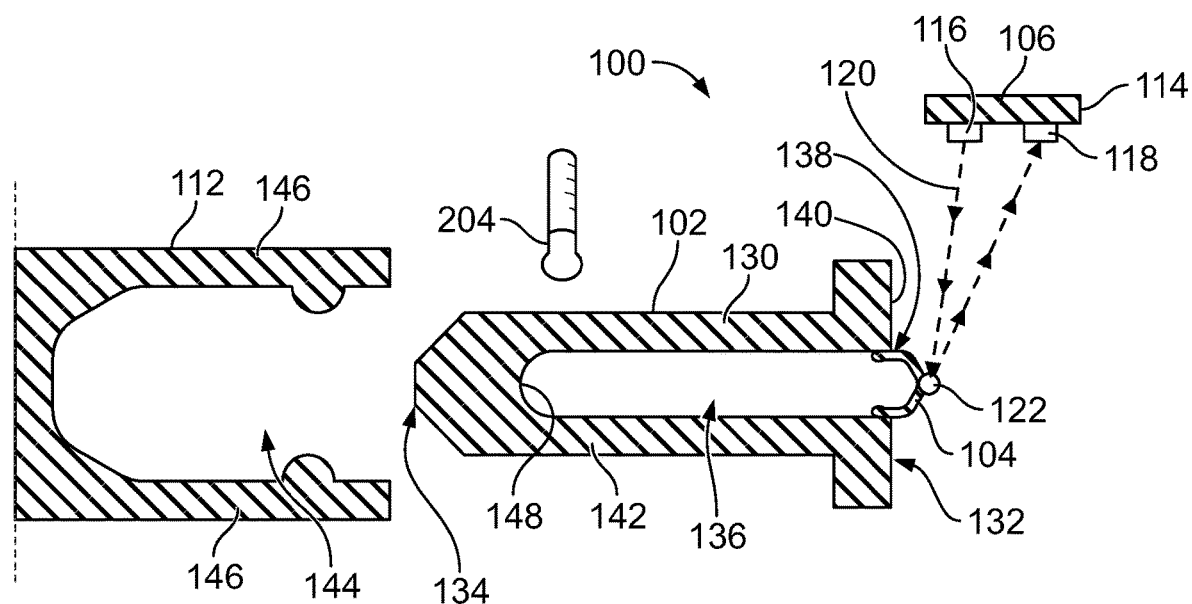
FIG. 1 is a cross-sectional illustration of a thermal sensing system for monitoring a temperature of one or more electrical contacts according to an embodiment.

FIG. 1 is a cross-sectional illustration of a thermal sensing system 100 for monitoring a temperature of one or more electrical contacts according to an embodiment. The thermal sensing system 100 includes an electrical contact 102, a sensing element 104, and a position sensor 106. The electrical contact 102 is configured to releasably engage a mating contact 112 to establish an electrically conductive path between the two contacts 102, 112 for conveying electrical current in the form of power or signals. The electrical contact 102 is disengaged from the mating contact 112 in FIG. 1, although the contacts 102, 112 are poised for mating. In a non-limiting example, the electrical contact 102 may be a power terminal that is utilized to convey DC current for powering a load and/or storing charge in a battery pack or another electrical storage device. The electrical contact 102 may be configured to handle DC current at high current rates up to or exceeding 500 A and high voltages up to or exceeding 1000 V. Alternatively, the electrical contact 102 may be used to convey data and/or control signals at lower electrical energy levels.

The sensing element 104 is mounted to the electrical contact 102. The sensing element 104 is movable relative to the electrical contact 102 based on a temperature of the electrical contact 102. The sensing element 104 may move axially, rotationally, or the like.

The position sensor 106 is spaced apart from both the electrical contact 102 and the sensing element 104. The position sensor 106 is electrically isolated from the electrical contact 102 by a dielectric material, such as air. The position sensor 106 detects a position change or movement of the sensing element 104 relative to the electrical contact 102 without engaging the sensing element 104, such that the position sensor 106 is a non-contact sensor. The position sensor 106 may be any type of non-contact position and/or movement sensor, such as, but not limited to, an optocoupler, a Hall effect sensor, a capacitive displacement sensor, an ultrasonic transducer, an optical proximity sensor, or the like. For example, the position sensor 106 according to the non-limiting example illustrated in FIG. 1 has a substrate 114 with an energy emitter 116 and an energy receiver 118 mounted on the substrate 114. The energy emitter 116 is controlled to emit electromechanical energy pulses 120 in the form of light (e.g., visible, UV, infrared, etc.), ultrasound, or the like. The energy pulses 120, such as beams or waves, are directed towards the sensing element 104. The receiver 118 is configured to receive the energy pulses 120 that reflect off of a distal tip 122 of the sensing element 104. Although the position sensor 106 has a discrete emitter 116 and receiver 118 in FIG. 1, in an alternative embodiment the emitter and receiver may be integrated into a single component, such as a transceiver. In another alternative embodiment, the emitter 116 and receiver 118 may be disposed on different, discrete substrates instead of disposed on the same substrate 114. For example, the sensing element 104 may be disposed between the emitter 116 and the receiver 118.

Characteristics of the energy pulses 120 received by the receiver 118 are used to indicate the position and/or movement of the sensing element 104. The characteristics may include a direction, intensity, frequency, or the like of the energy pulses 120. For example, in FIG. 1, the receiver 118 receives the energy pulses 120 after the pulses 120 reflect off of a distal tip 122 of the sensing element 104. The characteristics of the pulses 120 received at the receiver 118 are analyzed to determine the position of the sensing element 104. Alternatively, the characteristics of the energy pulses 120 used to determine the position of the sensing element 104 may be the presence or absence of receipt of the pulses 120 at the receiver 118. For example, although not shown in FIG. 1, if the distal tip 122 of the sensing element 104 does not reflect the pulses 120 back to the receiver 118, the absence of receipt of the pulses 120 may indicate the position of the sensing element 104. The sensing element 104 may fail to reflect the pulses 120 to the receiver 118 if the distal tip 122 is disposed behind an obstruction that absorbs or redirects the pulses 120 away from the receiver 118, for example. Subsequent receipt of the pulses 120 by the receiver 118 indicates that the sensing element 104 has moved to a different position.

The electrical contact 102 has a shaft 130 that extends from a mounting end 132 to a mating end 134. In the illustrated embodiment, the shaft 130 defines a pin-shaped mating segment 142 at the mating end 134. The pin-shaped mating segment 142 engages the mating contact 112. The mating contact 112 in the illustrated embodiment has a socket 144 that receives the mating end 134 of the shaft 130 therein. The socket 144 is defined between two contact arms 146 of the mating contact 112.

The shaft 130 defines a channel 136 therein. The channel 136 extends into an interior of the shaft 130 from an opening 138 at an exterior surface 140 of the shaft 130. Optionally, the opening 138 is located at the mounting end 132 of the shaft 130. The channel 136 may be elongated parallel to a longitudinal axis of the shaft 130. The channel 136 extends from the opening 138 at the mounting end 132 towards the mating end 134. The channel 136 extends to a closed end 148, such that the channel 136 does not project through the mating end 134 of the shaft 130. The opening 138 may represent the only external opening of the channel 136.

The sensing element 104 is disposed at least partially outside of the channel 136 and is operably connected to the channel 136 through the opening 138. In the illustrated embodiment, the sensing element 104 projects through the opening 138, and the distal tip 122 is outside of the channel 136. The sensing element 104 is configured to move relative to the electrical contact 102 based on a temperature (e.g., thermal energy) within the channel 136.

According to at least one embodiment, the thermal sensing system 100 lacks electrical circuitry on or proximate to the electrical contact 102, so there is little or no risk of electrical arcing and/or interference in the thermal sensing system 100 caused by high voltage electrical current that is conveyed through the electrical contact 102. For example, the sensing element 104 coupled to the electrical contact 102 may lack electrical circuitry. The position sensor 106 is a non-contact sensor that is sufficiently spaced apart from the electrical contact 102 and/or sufficiently insulated from the electrical contact 102 by an intervening structure to prevent damage and/or interference in the circuitry of the sensor 106 from the current conveyed along the electrical contact 102.

Figure 2:
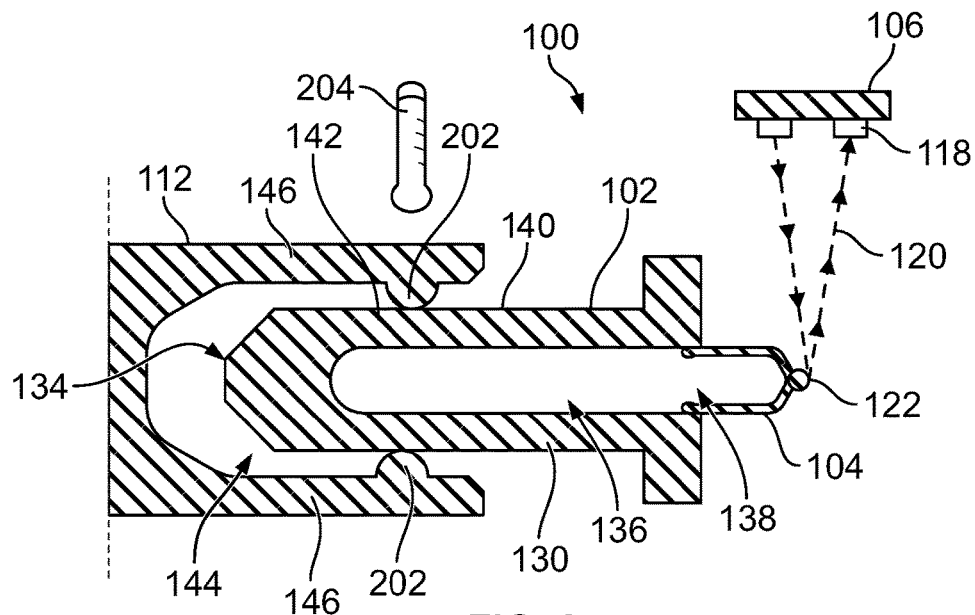
FIG. 2 illustrates the thermal sensing system shown in FIG. 1 with an electrical contact thereof mated to a mating contact.

Additional reference is made to FIG. 2, which illustrates the thermal sensing system 100 shown in FIG. 1 with the electrical contact 102 mated to the mating contact 112. For example, the mating end 134 of the contact 102 is within the socket 144, and the contact arms 146 of the mating contact 112 engage the exterior surface 140 of the shaft 130 at a mating interface along the pin-shaped mating segment 142. For example, the contact arms 146 may have protrusions 202 that maintain mechanical and electrical connection with the shaft 130 at the mating interface while the contacts 102, 112 are mated. The engagement between the electrical contact 102 and the mating contact 112 establishes a conductive path for current transfer across the mating interface.

Electrical current is transferred between the contacts 102, 112 across the engagement interfaces. During the current transfer, the contacts 102, 112 generate heat due to electrical resistances. The resistances may be attributable to material properties. The amount of heat generated may be based at least in part on the voltage and/or current of the electrical energy transfer. For example, high voltage and/or high current power transfer may generate more heat than a lower voltage and/or current power transfer. The heat increases the temperature of the electrical contact 102. The temperature of the electrical contact 102 during the current transfer is greater than the temperature of the electrical contact 102 when the electrical contact 102 is disconnected from the mating contact 112, as shown in FIG. 1. For example, thermometer indicia 204 in both FIGS. 1 and 2 indicate a greater temperature of the contact 102 in FIG. 2 than in FIG. 1. FIG. 2 therefore represents a heated state of the thermal sensing system 100, and FIG. 1 represents a cooled state.

The heat that is generated increases the temperature within the channel 136 of the shaft 130. The temperature increase in the channel 136 causes the sensing element 104 to move relative to the electrical contact 102. In the illustrated embodiment, the sensing element 104 axially elongates in a direction away from the channel 136. For example, the distal tip 122 of the sensing element 104 is located farther from the opening 138 in the heated state than the cooled state shown in FIG. 1. The position sensor 106 detects the position change of the distal tip 122 of the sensing element 104 based on the energy pulses 120 that reflect from the distal tip 122 to the receiver 118.

The thermal sensing system 100 may be calibrated such that the sensing element 104 does not change position (or does not achieve a designated position) until the temperature within the channel 136 of the shaft 130 crosses a designated threshold temperature. For example, the designated threshold temperature may represent an upper limit of a safe operating temperature range. Upon detecting that the temperature exceeds the upper limit, a control device operably connected to the position sensor 106 may automatically implement a responsive action designed to cool the electrical contact 102 and prevent damage. For example, the control device may derate (e.g., slow) or possible even cease the current transfer between the contacts 102, 112. The thermal sensing system 100 is not limited to detecting crossing of single threshold temperature. For example, the sensing element 104 may be calibrated with the position sensor 106 such that movement of the sensing element 104 to a first designated position indicates that the electrical contact 102 is at a first temperature, and movement of the sensing element 104 to a second designated position indicates that the electrical contact 102 is at a second temperature. The control device may be configured to take one predetermined action based on detection of the first temperature, and a second predetermined action based on detection of the second temperature.

FIGS. 1 and 2 are generic, partially schematic illustrations intended to explain the general function and operation of the thermal sensing system 100. Specific embodiments of the thermal sensing system 100 are presented and described herein with reference to FIGS. 3 through 13. Potential applications of the thermal sensing system 100 are presented and described herein with reference to FIGS. 14 through 16.

Figure 3:
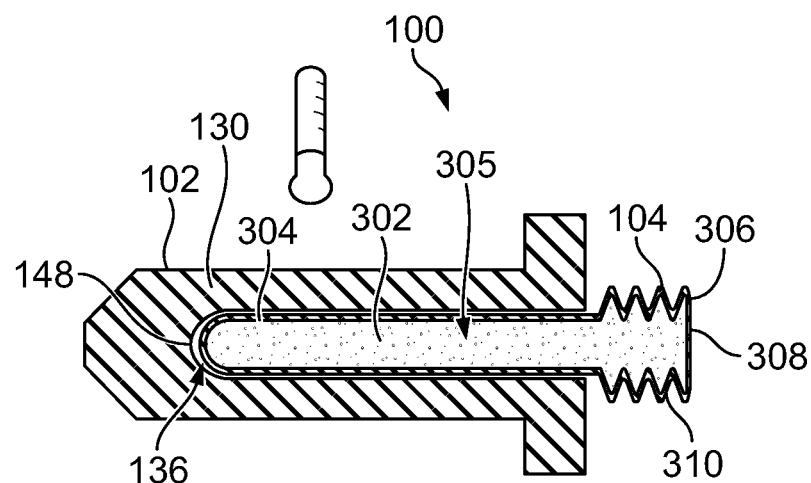
FIG. 3 is a cross-sectional illustration of a portion of the thermal sensing system showing the electrical contact and a sensing element of the thermal sensing system according to one embodiment.

FIG. 3 is a cross-sectional illustration of a portion of the thermal sensing system 100 showing the electrical contact 102 and the sensing element 104 according to one embodiment. In the illustrated embodiment, the thermal sensing system 100 also includes a working material 302 that is within the channel 136 of the shaft 130 of the electrical contact 102. The working material 302 has a temperature-dependent expansive property. For example, the volume of the working material 302 increases responsive to a positive temperature change in the channel 136. The expansion may be due to a phase change (e.g., from a liquid to a gas or from a solid to a liquid) and/or may be attributable to increasing vapor pressure of a gas. In embodiment, the working material 302 is confined within the channel 136 between the closed end 148 thereof and the sensing element 104. Therefore, as the working material 302 expands, the working material 302 exerts a force on the sensing element 104 in a direction away from the channel 136. The force exerted by the working material 302 on the sensing element 104 may vary based on a temperature change of the working material 302. The sensing element 104 moves relative to the electrical contact 102 from a first position in response to the force from the working material 302 exceeding the forces that bias the sensing element 104 in the first position.

In the illustrated embodiment, the thermal sensing system 100 includes a tube 304 disposed at least partially within the channel 136. The tube 304 is mechanically coupled to the sensing element 104. The working material 302 is contained within the tube 304. The tube 304 and the sensing element 104 may combine to define a sealed chamber 305. The working material 302 may be sealed within the chamber 305.

In the illustrated embodiment, the sensing element 104 is an expansion tip 306 that is configured to bi-directionally move between a retracted position and an extended position. The expansion tip 306 is in the retracted position in FIG. 3. The expansion tip 306 is hollow and includes an end wall 308 and one or more pleated side walls 310. The one or more pleated side walls 310 are between the tube 304 and the end wall 308, such that the end wall 308 is connected to the tube 304 via the one or more pleated side walls 310. In an embodiment, the expansion tip 306 may be generally cylindrical, such that a single pleated side wall 310 defines the perimeter of the expansion tip 306 along the length to the end wall 308. The cross-section line in FIG. 3 extends through two different portions of the pleated side wall 310. Alternatively, the expansion tip 306 may have a prismatic shape (e.g., a three-dimensional polygon) that includes multiple pleated side walls 310 between the end wall 308 and the tube 304. The pleated side wall 310 is concertinaed and defines multiple expandable folds. The pleated side wall 310 and the end wall 308 of the expansion tip 306 are disposed outside of the channel 136 of the electrical contact 102. The expansion tip 306 may be a bellows feature.

In at least one embodiment, the expansion tip 306 is configured to be in the retracted position shown in FIG. 3 when the electrical contact 102 is in a cooled state. For example, the pleated side wall 310 may have an integrated spring force that biases the expansion tip 306 towards the retracted position shown in FIG. 3. When the temperature of the working material 302 within the channel 136 is lower than a designated temperature, the force exerted by the working material 302 on the end wall 308 of the expansion tip 306 is insufficient to overcome the biasing force of the pleated side wall 310.

Figure 4:
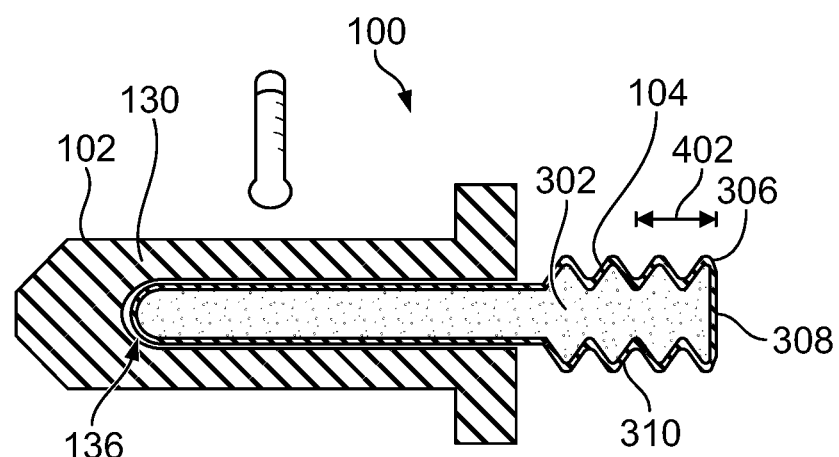
FIG. 4 is a cross-sectional illustration of the portion of the thermal sensing system shown in FIG. 3 with an expansion tip in an extended position.

FIG. 4 is a cross-sectional illustration of the portion of the thermal sensing system 100 shown in FIG. 3 with the expansion tip 306 in the extended position. The expansion tip 306 is configured to be in the extended position when the electrical contact 102 is in the heated state. For example, as the temperature of the working material 302 within the channel 136 increases, the force exerted by the working material 302 on the end wall 308 of the expansion tip 306 increases. Upon the temperature of the working material 302 exceeding a designated threshold, the working material 302 exerts a sufficient force to overcome the biasing spring force of the pleated side wall 310, which causes the expansion tip 306 to expand. For example, the end wall 308 moves in a direction away from the channel 136 along a displacement axis 402 from a first position of the end wall 308 shown in FIG. 3 to a second position of the end wall 308 shown in FIG. 4. The displacement axis 402 may be parallel to a longitudinal axis of the channel 136.

In one non-limiting example embodiment, the working material 302 is in the gas phase throughout an operating temperature range of the electrical contact 102. The operating temperature range represents the range of temperatures of the electrical contact 102 during normal operation. For example, the operating temperature range may be between about 20° C. and about 95° C. Therefore, the working material 302 according to one embodiment may be in the gas phase throughout the temperature range from 20° C. to 95° C. The working material 302 is a gas during the cooled state shown in FIG. 3 and the heated state shown in FIG. 4. The increasing temperature of the electrical contact 102 during operation (caused by heat generated by resistances) heats the gas, which increases the vapor pressure of the gas. The vapor pressure may increase gradually with increasing temperature. The expansion tip 306 moves from the retracted position towards the extended position in response to the vapor pressure exceeding the biasing spring force of the pleated side wall 310.

In another non-limiting example embodiment, the working material 302 is a saturated liquid and vapor mixture that has a boiling point within the operating temperature range of the electrical contact 102. For example, the working material 302 is at least partially in the liquid phase at a lower limit of the operating temperature range, and is at least partially in the gas phase at an upper limit of the operating temperature range. The vapor pressure of the gas phase is temperature dependent and moves the expansion tip 306 to the extended position in response to the temperature exceeding a threshold temperature. The working material 302 optionally may be an alcohol, such as methanol, ethanol, isopropyl alcohol, or the like. Alternatively, the working material 302 may be another compound, such as benzene, acetone, and various other liquids with boiling points within the operating temperature range of the electrical contact 102.

In yet another non-limiting example embodiment, the working material 302 is a wax that has a melting point within the operating temperature range of the electrical contact 102. For example, the wax may be incompressible that exhibits a phase change as the temperature within the channel 136 increases from a lower limit of the operating range to an upper limit of the operating range. The wax has a temperature-dependent expansive property that causes the volume of the wax to expand during the phase change from the solid state to the liquid state. Because the wax may be incompressible, the volume change of the wax directly translates to expansion of the expansion tip 306. The expansion tip 306 in this embodiment may exhibit a relatively sharp transition between the retracted and extended positions because the volume change of the wax occurs at the melting point temperature. For example, the expansion tip 306 may only move relative to the electrical contact 102 while the wax undergoes phase change, such that the expansion tip 306 remains relatively stationary even if the temperature of the wax changes without crossing the melting point temperature.

Although not shown in FIGS. 3 and 4, the position sensor 106 (shown in FIGS. 1 and 2) is configured to detect the change in position of the expansion tip 306 from the retracted position to the extended position. In at least one embodiment, the working material 302 may be selected and/or calibrated with the expansion tip 306 such that the expansion tip 306 moves from the retracted position to the extended position in response to the temperature of the electrical contact 102 exceeding a predetermined temperature. The predetermined temperature may be an upper limit of a safe operating temperature range. Therefore, the detection of the expansion tip 306 in the extended position may indicate that the electrical contact 102 is outside of the safe operating temperature range. In response, a control device (including one or more processors) operably connected to the position sensor 106 may automatically generate control signals to take one or more predetermined actions. The predetermined actions may include derating the electrical current transfer along the electrical contact 102, notifying an operator, initiating or increasing output of a fan or air conditioning system to cool the electrical contact 102, or the like.

Figure 5:
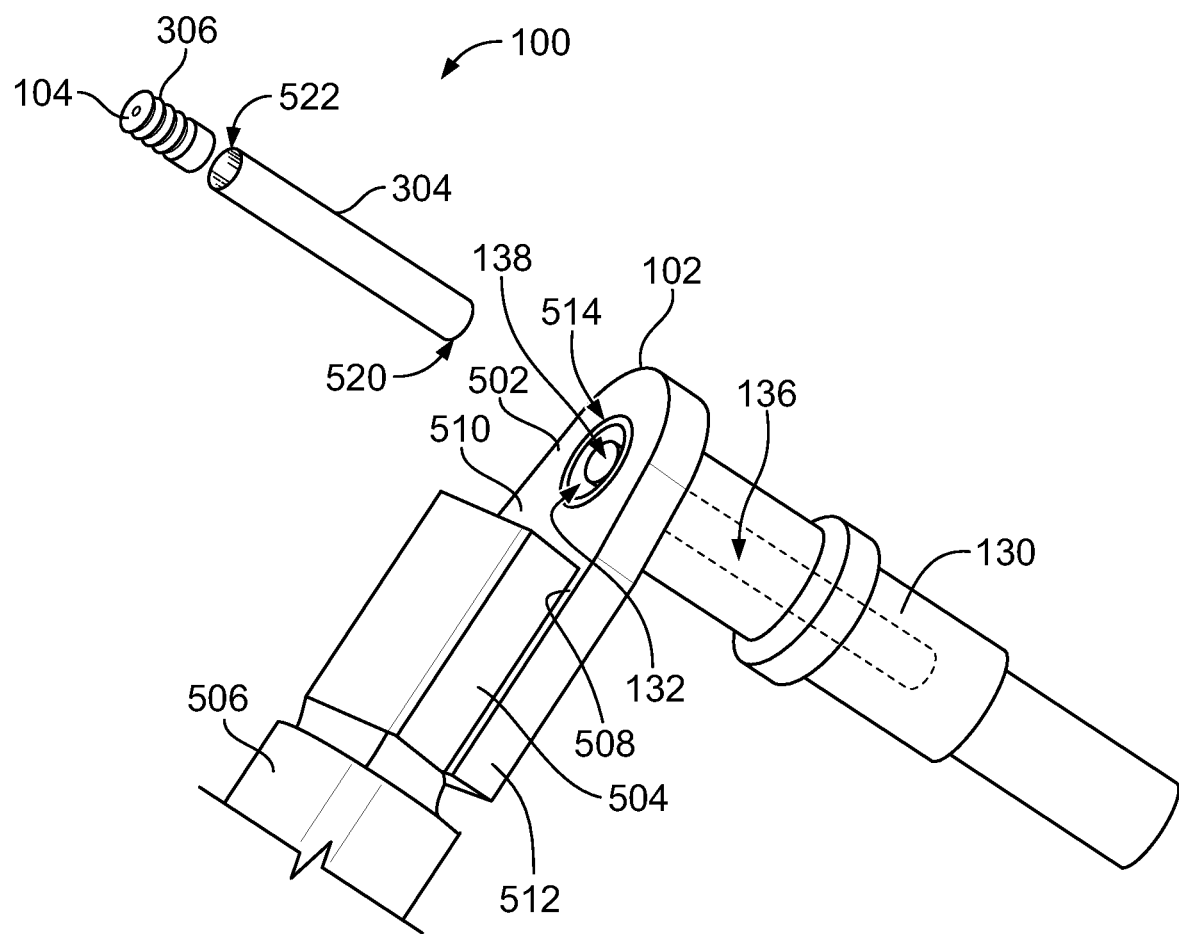
FIG. 5 is an exploded perspective view of a portion of the thermal sensing system according to the embodiment shown in FIGS. 3 and 4.

FIG. 5 is an exploded perspective view of a portion of the thermal sensing system 100 according to the embodiment shown in FIGS. 3 and 4. FIG. 5 shows the electrical contact 102, the tube 304, and the sensing element 104 that is defined by the expansion tip 306. The electrical contact 102 may have a head 502 that is coupled to the mounting end 132 of the shaft 130. The head 502 is terminated (e.g., mechanically secured and electrically connected) to one or more conductors 504 of an electrical cable 506. The head 502 may have a termination area 508 that is planar and engages the one or more conductors 504 via chemical bonding, such as welding, soldering, or the like. The termination area 508 may be disposed along a rear side 510 of the respective head 502 that faces away from the shaft 130. In the illustrated embodiment, the head 502 includes an elongated tab 512 that projects outward from the location where the head 502 is connected to the shaft 130, and the termination area 508 is located along the tab 512.

In the illustrated embodiment, the head 502 is a discrete component from the shaft 130. The shaft 130 is received into an opening 514 in the head 502 to mechanically couple the two components together. The shaft 130 may be threadably connected to helical threads within the opening 514, or connected via an interference fit, an adhesive, welding, or another chemical bonding. In an alternative embodiment, the electrical contact 102 may be a unitary, monolithic structure such that the shaft 130 is integral to the head 502 without requiring a joining operation to couple the two components.

The channel 136 within the shaft 130 is elongated parallel to a longitudinal axis of the shaft 130. The opening 138 of the channel 136 is located at the mounting end 132 of the shaft 130, and is exposed within the opening 514 in the head 502.

The tube 304 is shown separate from the expansion tip 306. The tube 304 has a closed end 520 and an open end 522 opposite the closed end 520. In the illustrated embodiment, the tube 304 extends linearly between the two ends 520, 522, but the tube 304 may curve or bend at an angle in an alternative embodiment. The working material 302 (shown in FIGS. 3 and 4) may be loaded into the tube 304 through the open end 522. After loading the working material 302 into the tube 304, the expansion tip 306 may be mechanically coupled to the tube 304 at the open end 522 to enclose the working material 302 within the tube 304 and the expansion tip 306. The expansion tip 306 may be secured to the tube 304 via laser welding, adhesive, crimping, fasteners, or the like. The coupling of the expansion tip 306 to the tube 304 may hermetically seal the working material 302 within the tube 304 and expansion tip 306.

Figure 6:
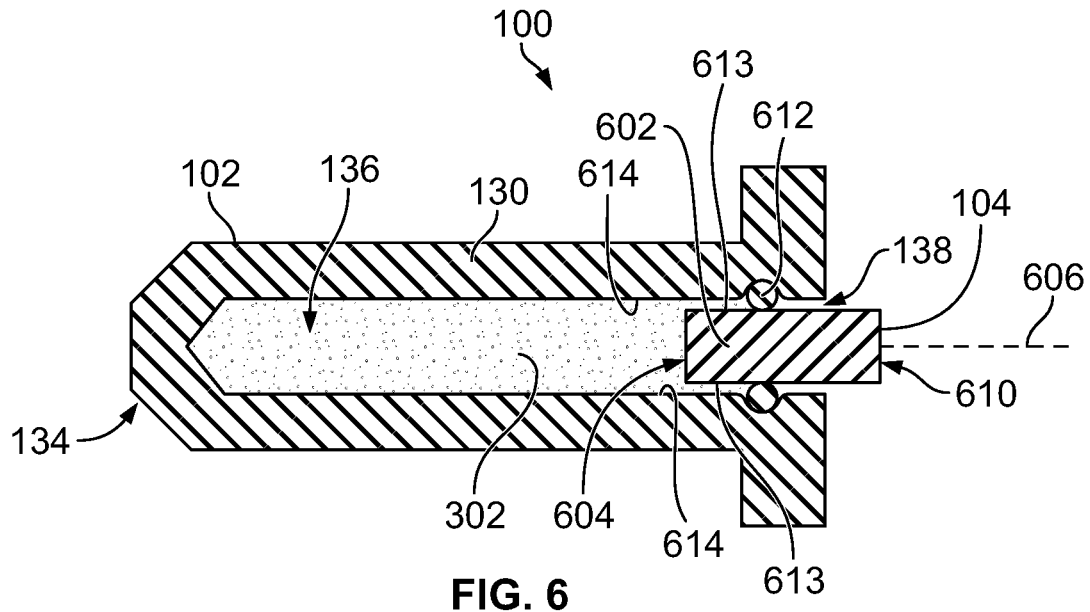
FIG. 6 is a cross-sectional illustration of a portion of the thermal sensing system showing the electrical contact and the sensing element according to another embodiment.

FIG. 6 is a cross-sectional illustration of a portion of the thermal sensing system 100 showing the electrical contact 102 and the sensing element 104 according to another embodiment. The sensing element 104 in FIG. 6 is a plunger 602, instead of the expansion tip 306 shown in FIGS. 3 through 5. The plunger 602 projects through the opening 138 of the channel 136 of the shaft 130. The plunger 602 has an interior end 604 that is within the channel 136. The plunger 602 is movable relative to the electrical contact 102 by the working material 302 that is within the channel 136. The working material 302 impinges upon the interior end 604 of the plunger 602. Similar to the expansion tip 306, the plunger 602 is configured to be forced by the working material 302 between a first position of the plunger 602 and a second position of the plunger 602 based on the temperature within the channel 136. For example, a temperature increase within the channel 136 causes the working material 302 to force the interior end 604 of the plunger 602 to move towards the opening 138 of the channel 136. The plunger 602 moves bi-directionally along an actuation axis 606. The actuation axis 606 is parallel to the longitudinal axis of the channel 136 in the illustrated embodiment. The working material 302 within the channel 136 may be any of the working materials described with reference to FIGS. 3 and 4 that are used to move the expansion tip 306.

The plunger 602 is configured to be moved by the working material 302 along the actuation axis 606 between a retracted position and an extended position. The interior end 604 of the plunger 602 that is within the channel 136 is disposed closer to the opening 138 in the extended position than in the retracted position. In the extended position, a second end 610 of the plunger 602 that is opposite the interior end 604 is disposed outside of the channel 136 and is able to be detected by the position sensor 106 (shown in FIG. 1). Optionally, the position of the plunger 602 in FIG. 6 may represent the extended position. As the plunger 602 transitions from the extended position towards the retracted position, the plunger 602 moves towards the mating end 134 of the contact 102 and the second end 610 approaches the opening 138. In the retracted position, the second end 610 of the plunger 602 may remain outside of the channel 136, may be flush with the opening 138, and/or may be recessed within the channel 136. Alternatively, the position shown in FIG. 6 may represent the retracted position, and the second end 610 moves even farther from the channel 136 to the extended position. The position sensor 106 is able to detect the position change of the second end 610 of the plunger 602, or of an indicator flag mounted on the second end 610.

The thermal sensing system 100 may also include an annular seal 612 that seals the channel 136 around the plunger 602. For example, the annular seal 612 may radially extend between an outer surface 613 of the plunger 602 and an interior surface 614 of the shaft 130. The annular seal 612 confines the working material 302 within the channel 136. The annular seal 612 allows for sliding movement of the plunger 602 along the actuation axis 606 relative to the annular seal 612. Optionally, the annular seal 612 may be a compressive gasket, such as an O-ring.

In the illustrated embodiment, the thermal sensing system 100 has no tube, so the working material 302 is confined within and engages the interior surface 614 of the shaft 130. In an alternative embodiment, the thermal sensing system 100 may include the tube 304 (shown in FIG. 5), and the annular seal 612 radially extends between the outer surface 613 of the plunger 602 and an interior surface of the tube 304 to seal the working material 302 within the tube 304.

Figure 7:
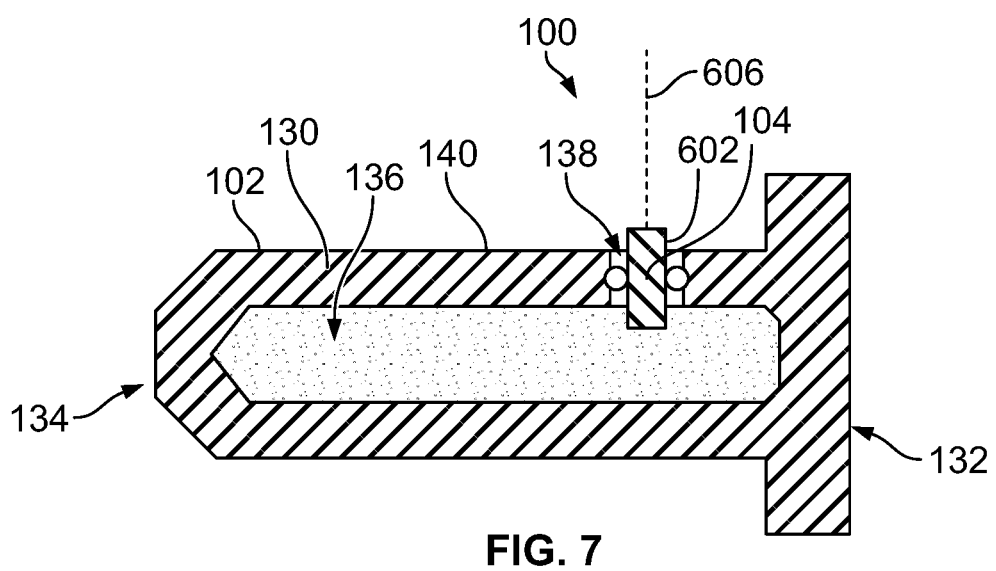
FIG. 7 shows a cross-sectional illustration of the portion of the thermal sensing system shown in FIG. 6 according to an alternative embodiment.

FIG. 7 shows a cross-sectional illustration of the portion of the thermal sensing system 100 shown in FIG. 6 according to an alternative embodiment. In FIG. 7, the opening 138 of the channel 136 is not located at the mounting end 132 of the electrical contact 102 unlike in FIG. 6. Rather, the opening 138 is disposed along a cylindrical exterior surface 140 of the shaft 130. The opening 138 is spaced apart between the mating end 134 and the mounting end 132 of the shaft 130. The plunger 602 represents the sensing element 104, similar to the embodiment shown in FIG. 6. In FIG. 7, the actuation axis 606 along which the plunger 602 bi-directionally moves is transverse to the longitudinal axis of the channel 136 (and of the shaft 130). The mechanism causing the movement of the plunger 602 in the illustrated embodiment may be the same as the embodiment shown in FIG. 6.

Figure 8:
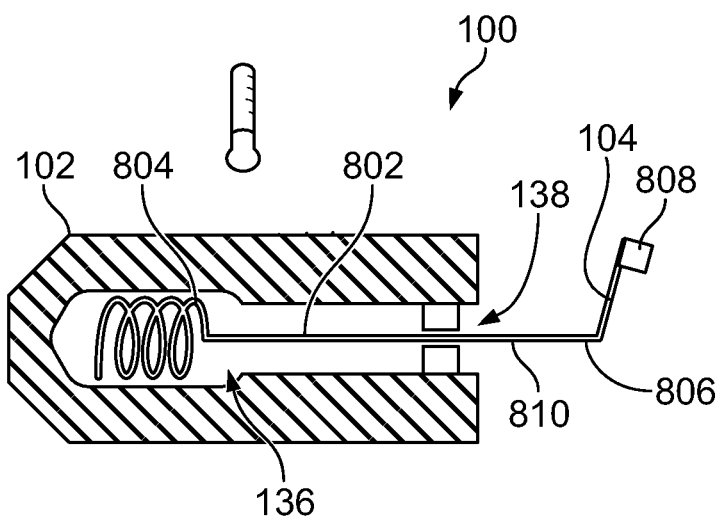
FIG. 8 is a cross-sectional illustration of a portion of the thermal sensing system showing the electrical contact and the sensing element according to another embodiment.

FIG. 8 is a cross-sectional illustration of a portion of the thermal sensing system 100 showing the electrical contact 102 and the sensing element 104 according to another embodiment. In FIG. 8, the sensing element 104 is a metallic sensing element 802 that comprises one or more metals. The metallic sensing element 802 protrudes through the opening 138 of the electrical contact 102, such that the metallic sensing element 802 has an interior segment 804 within the channel 136 and an exterior segment 806 disposed outside of the channel 136. The exterior segment 806 is configured to move relative to the electrical contact 102 from a first position to a second position in response to a temperature of the interior segment 804 exceeding a designated threshold temperature. FIG. 8 shows the exterior segment 806 in the first position relative to the electrical contact 102. The exterior segment 806 of the metallic sensing element 802 may be attached to an indicator flag 808. The indicator flag 808 may be more recognizable and detectable to the position sensor 106 (shown in FIG. 1) than the end of the exterior segment 806 alone. The indicator flag 808 may be any marker that is detectable by the position sensor 106, such as a light-weight piece of cloth, sheet metal, or the like.

The thermal sensing system 100 in FIG. 8 lacks a working material that exerts a temperature-dependent expansive force against the metallic sensing element 802. For example, the metallic sensing element 802 has material properties that enable the exterior segment 806 to move based on a temperature change of the interior segment 804 of the metallic sensing element 802. In a non-limiting example embodiment, the metallic sensing element 802 is a wire 810 that comprises a shape memory alloy. For example, the shape memory alloy may be nickel-titanium, copper-aluminum-nickel, or the like. The wire 810 may have multiple preset positions. For example, the wire 810 may be formed into a first shape that represents an original shape of the wire 810. The wire 810 may be subsequently deformed into a second shape. Upon heating the wire 810 above a transition temperature of the wire 810, the wire 810 may return to the pre-deformed original shape. The deformation of the wire 810 positions the exterior segment 806 of the wire 810 in a first preset position. As the wire 810 returns to the original shape due to heating, the exterior segment 806 moves to a second preset position. The wire 810 may have a one-way or two-way memory effect. For example, if the wire 810 is two-way, the deformed shape of the wire 810 may also be "memorized" such that the wire 810 moves to the original shape when heated above the transition temperature and moves back to the deformed shape when cooled below the transition temperature.

Figure 9:
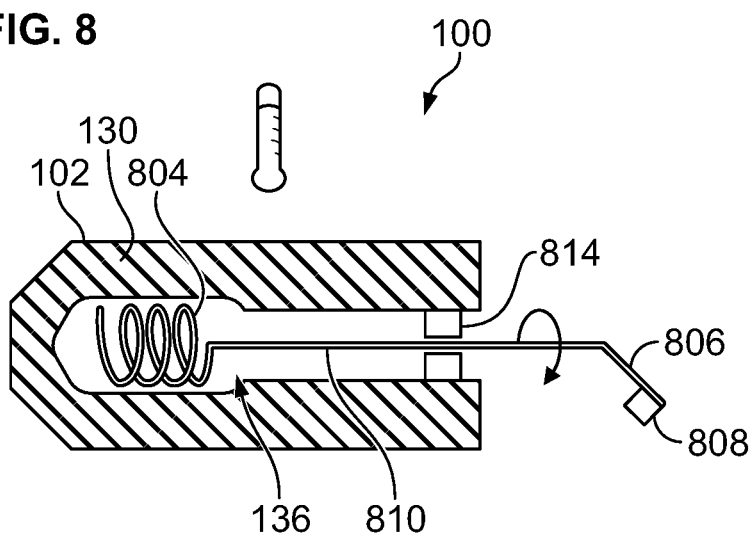
FIG. 9 is a cross-sectional illustration of the portion of the thermal sensing system shown in FIG. 8 with an exterior segment of a wire that represents the sensing element in a different position than in FIG. 8.

In FIG. 8, the wire 810 may be in the deformed shape and the exterior segment 806 of the wire 810 is in a first preset position. FIG. 9 is a cross-sectional illustration of the portion of the thermal sensing system 100 shown in FIG. 8 with the exterior segment 806 of the wire 810 in a different position than in FIG. 8. For example, the exterior segment 806 of the wire 810 is in a second preset position in FIG. 9. As the temperature within the channel 136 of the shaft 130 increases, eventually the temperature of the interior segment 804 of the wire 810 exceeds the transition temperature of the wire 810. The transition temperature may be a material property of the wire 810. The temperature exceeding the transition temperature causes the wire 810 to revert back to the original shape, which moves the exterior segment 806 relative to the electrical contact 102. The position sensor 106 (shown in FIG. 1) is able to detect the position change of the indicator flag 808 attached to the exterior segment 806. The properties of the wire 810 may be calibrated with the operation of the electrical contact 102 such that the transition temperature of the wire 810 corresponds to a designated threshold temperature of the electrical contact 102. For example, the designated threshold temperature may be an upper limit of a safe operating temperature range for the electrical contact 102, so transition of the wire 810 indicates that the temperature of the electrical contact 102 is greater than the upper limit.

The interior segment 804 of the wire 810 optionally may be coiled, which may increase the sensitivity of the wire 810 to the thermal energy within the channel 136. The exterior segment 806 in the illustrated embodiment rotates from the first position shown in FIG. 8 to the second position shown in FIG. 9, but the exterior segment 806 may move in other ways in other embodiments, such as bending, coiling, moving along an axis, or the like. The wire 810 may be mounted to the electrical contact 102 via a mechanical holder 814, such as a gasket or the like. The mechanical holder 814 is disposed within the channel 136 in the illustrated embodiment, but alternatively may be outside the channel 136.

Figure 10:
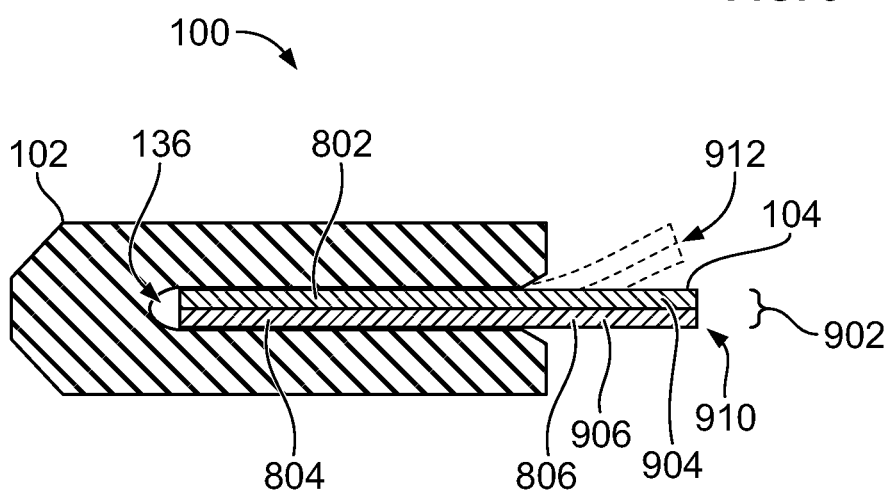
FIG. 10 is a cross-sectional illustration of a portion of the thermal sensing system showing the electrical contact and the sensing element according to yet another embodiment.

FIG. 10 is a cross-sectional illustration of a portion of the thermal sensing system 100 showing the electrical contact 102 and the sensing element 104 according to yet another embodiment. The illustrated embodiment is similar to the embodiment shown in FIGS. 8 and 9 because the sensing element 104 is a metallic sensing element 802 that has an interior segment 804 within the channel 136 and an exterior segment 806 disposed outside of the channel 136. The exterior segment 806 is configured to move relative to the electrical contact 102 from a first position to a second position in response to a temperature of the interior segment 804 exceeding a designated threshold temperature. The illustrated embodiment differs from FIGS. 8 and 9 because the metallic sensing element 802 is a bimetallic strip 902 instead of a wire comprising a shape memory alloy.

The bimetallic strip 902 includes a first metal layer 904 and a second metal layer 906. The two metal layers 904, 906 are fixed relative to each other. For example, the layers 904, 906 may be in a stacked arrangement with the two layers 904, 906 lying directly against one another or indirectly via an intervening layer. The two layers 904, 906 are directly stacked against each other in FIG. 10. The two metal layers 904, 906 have different metallic compositions and properties. For example, the first metal layer 904 has a different coefficient of expansion than the second metal layer 906. The coefficient of expansion of the second metal layer 906 optionally may be greater than that of the first metal layer 904. As the interior segment 804 is heated within the channel 136 of the electrical contact 102, the second metal layer 906 expands at a greater rate than the first metal layer 904. The expansion gradient causes the exterior segment 806 to move relative to the electrical contact 102 from a first position to a second position, which is detectable by the position sensor 106 (shown in FIG. 1). For example, the second metal layer 906 may cause the exterior segment 806 to bend and curve in the direction of the first metal layer 904 in the stack to the second position. In FIG. 10, the first position 910 of the exterior segment 806 is shown in solid lines and the second position 912 is shown in phantom to indicate the movement of the exterior segment 806. In an alternative embodiment, the bimetallic strip 902 may be twisted or coiled instead of flat, which may result in rotary motion of the exterior segment 806.

Figure 11:
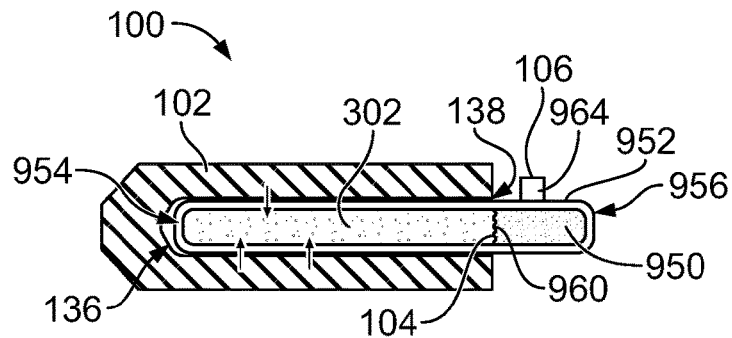
FIG. 11 is a cross-sectional illustration of the thermal sensing system showing a fluid interface that represents the sensing element in a first position according to another embodiment.

FIG. 11 is a cross-sectional illustration of the thermal sensing system 100 showing the electrical contact 102, the sensing element 104, and the position sensor 106 according to still another embodiment. The sensing element 104 in the illustrated embodiment is a noncondensable gas 950 contained within an enclosed tube 952. The tube 952 also contains a working material 302. The tube 952 has an interior end 954 within the channel 136 of the electrical contact 102 and an exterior end 956 outside of the channel 136 (e.g., the tube 952 projects through the opening 138).

In the illustrated embodiment, the tube 952, working material 302, and noncondensable gas 950 represent a variable conductance heat pipe. The working material 302 moves the noncondensable gas 950 within the tube 952 based on the temperature within the channel 136 caused by the heat generated along the electrical contact 102. The position sensor 106 detects the movement of the noncondensable gas 950 by detecting a position change in a fluid interface 960 between the noncondensable gas 950 and the working material 302. In FIG. 11, the fluid interface 960 is in a first position within the tube 952.

During operation, heat that is generated by the electrical contact 102 enters the tube 952 along the segment of the tube 952 that is within the channel 136. The heat increases the temperature of the working material 302. The working material 302 may be a saturated liquid, such that the heat causes a phase change of the liquid to vapor. The heated vapor moves towards the exterior end 956 of the tube 952, which is cooler than the interior end 954. For example, the exterior end 956 may be exposed to air flow, thermally connected to a mechanical heat sink, or the like, which enables a temperature gradient between the hotter interior end 954 and the cooler exterior end 956.

Figure 12:
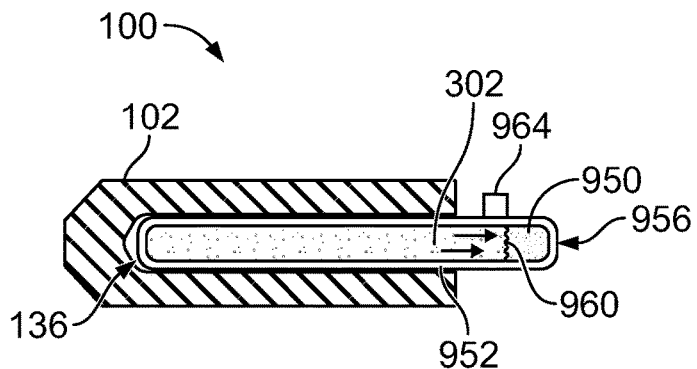
FIG. 12 shows the thermal sensing system of FIG. 11 in which a fluid interface that represents the sensing element is in a second position.

FIG. 12 shows the thermal sensing system 100 of FIG. 11 in which the fluid interface 960 is in a second position within the tube 952. The noncondensable gas 950 is compressed by the vapor pressure of the working material 302, which moves the fluid interface 960 from the first position shown in FIG. 11 to the second position shown in FIG. 12. The heated vapor that flows towards the exterior end 956 forces the noncondensable gas 950 towards the exterior end 956 and compresses the noncondensable gas 950 into the exterior end 956. The volume occupied by the noncondensable gas 950 (e.g., and the position of the fluid interface 960) may be a function of temperature. For example, higher temperatures within the channel 136 and the tube 952 cause more compression of the noncondensable gas 950 than lower temperatures. As a result, the fluid interface 960 is positioned closer to the exterior end 956 responsive to higher temperatures than lower temperatures.

The position sensor 106 monitors the position of the fluid interface 960, which is used to indicate the temperature within the channel 136 of the electrical contact 102. In the illustrated embodiment, the position sensor 106 is a temperature sensor 964 that is thermally connected to the tube 952 outside of the channel 136. The temperature sensor 964 is spaced apart from the electrical contact 102. The temperature sensor 964 is axially disposed between the electrical contact 102 and the exterior end 956 of the tube 952, and is spaced apart from the exterior end 956.

The temperature sensor 964 may detect the position of the fluid interface 960 based on a detected temperature within the tube 952. The noncondensable gas 950 may be cooler than the working material 302 because little or no vapor of the working material 302 may travel through the volume of noncondensable gas 950. For example, as the vapor moves outside of the channel 136 towards the exterior end 956 of the tube 952, the vapor may condense, giving up the latent heat of vaporization to the air or mechanical heat sink, before reaching the exterior end 956. Therefore, the temperature sensor 964 detecting a first temperature may indicate that the volume of noncondensable gas 950 aligns with the temperature sensor 964, and the temperature sensor 964 detecting a second, greater temperature may indicate that the vapor of the working material 302 aligns with the temperature sensor 964.

The electrical contact 102 is hotter in FIG. 12 than in FIG. 11. For example, the hotter temperature in FIG. 12 causes greater vapor pressure of the working material 302 that compresses the noncondensable gas 950 into a smaller volume than in FIG. 11. As a result, the fluid interface 960 is located closer to the exterior end 956 in the heated state shown in FIG. 12 than in the cooler state shown in FIG. 11. In FIG. 11, the volume of noncondensable gas 950 aligns with the temperature sensor 964. The fluid interface 960 is between the electrical contact 102 and the sensor 964. In FIG. 12, the vapor of the working material 302 aligns with the temperature sensor 964. The fluid interface 960 is between the temperature sensor 964 and the exterior end 956. The temperature sensor 964 detects the temperature of the working material 302 in FIG. 12, and detects the temperature of the noncondensable gas 950 in FIG. 11. Because the working material 302 may be hotter than the noncondensable gas 950, detecting a greater temperature indicates that the fluid interface 960 has moved beyond the temperature sensor 964 such that the temperature sensor 964 is no longer detecting the temperature of the noncondensable gas 950. The thermal sensing system 100 may be calibrated such that the fluid interface 960 does not move beyond the temperature sensor 964 (to be located between the sensor 964 and the exterior end 956) until the temperature within the channel 136 exceeds a designated threshold temperature.

Figure 13:
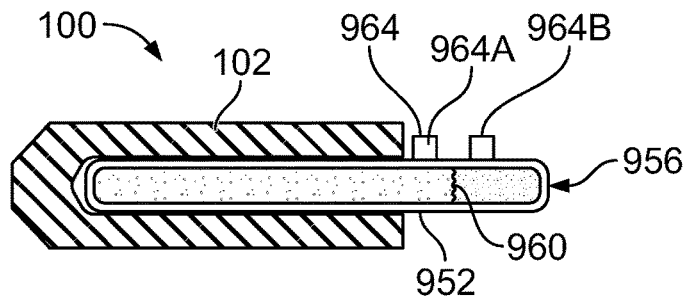
FIG. 13 shows the thermal sensing system of FIGS. 11 and 12 according to an alternative embodiment in which two sensors are utilized to detect the position of the fluid interface.

FIG. 13 shows the thermal sensing system 100 of FIGS. 11 and 12 according to an alternative embodiment in which two temperature sensors 964 are utilized as the position sensor 106 to detect the position of the fluid interface 960 within the tube 952. Both of the temperature sensors 964 are thermally connected to the exterior segment of the tube 952 between the electrical contact 102 and the exterior end 956 of the tube 952. The two temperature sensors 964 are axially spaced apart from each other and are spaced apart from the exterior end 956. The temperatures detected from each of the two temperature sensors 964 may be compared to determine the position of the fluid interface 960 within the tube 952. For example, if the temperature detected by a first temperature sensor 964A of the two sensors 964 is greater than the temperature detected by a second temperature sensor 964B of the two sensors 964, then the fluid interface 960 may be located between the two sensors 964A, 964B as shown in FIG. 13. If the temperatures detected by the two sensors 964A, 964B are approximately the same (within a designated margin of error), then the fluid interface 960 is not between the two sensors 964A, 964B. The use of multiple temperature sensors 964 may provide more accurate position detection of the fluid interface 960 than a single temperature sensor 964.

Figure 14:
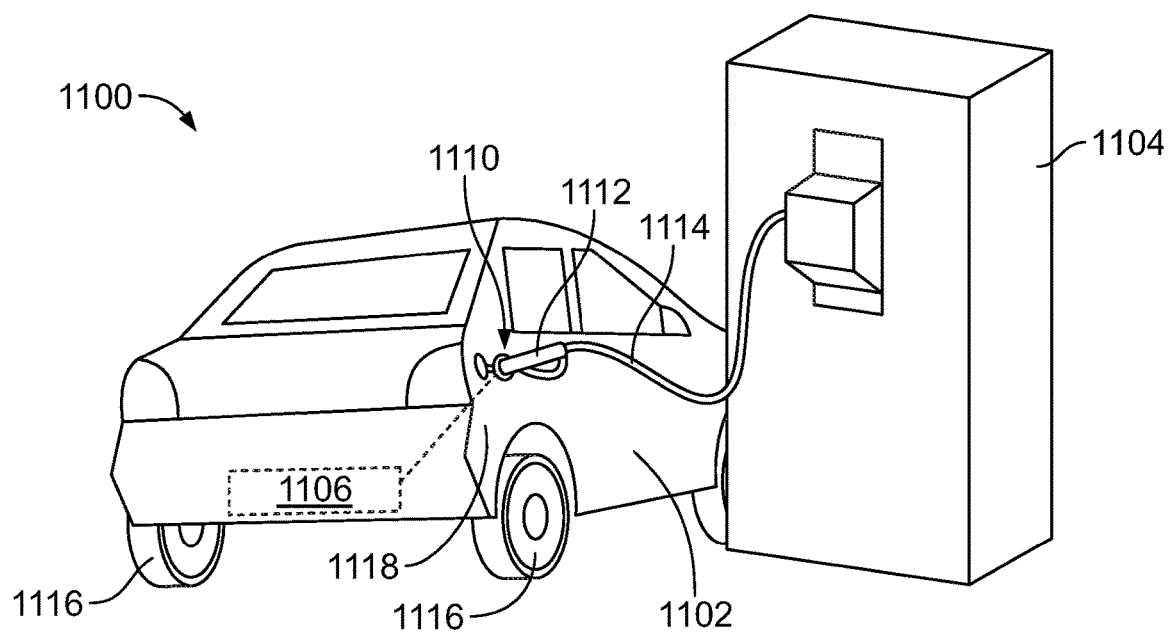
FIG. 14 illustrates a vehicle charging system that includes an electric vehicle parked next to a charging station according to an embodiment, and the thermal sensing system may be installed on the electric vehicle.

FIG. 14 illustrates a vehicle charging system 1100 that includes an electric vehicle 1102 parked next to a charging station 1104 according to an embodiment. The thermal sensing system 100 described herein may be utilized within the electric vehicle 102 as a non-limiting example application. The electric vehicle 1102 includes an onboard battery pack 1106 that is electrically connected to an onboard charging inlet 1110. The charging inlet 1110 is mounted to a side 1118 of the vehicle 1102 in the illustrated embodiment.

The vehicle 1102 may be a fully electric vehicle that lacks a combustion engine, a plug-in hybrid that includes both the battery pack 1106 and a combustion engine, or the like. The battery pack 1106 supplies electrical power (e.g., current) for powering a traction motor (not shown) of the vehicle 1102 to provide tractive effort to the drivetrain and wheels 1116. The tractive effort propels the vehicle 1102 along a route. Optionally, the traction motor may be selectively functional as a generator when tractive effort is not desired, such as when driving downhill, to generate electrical energy for charging the battery pack 1106 using regenerative braking. The battery pack 1106 may represent an array of batteries and/or battery cells.

The charging inlet 1110 is configured to connect with a mating connector of an external power source to recharge the battery pack 1106. In the illustrated embodiment, the charging station 1104 represents the external power source, and a plug connector 1112 of the charging station 1104 represents the mating connector. When the vehicle 1102 is not proximate to a charging station 1104, other external power sources that can be used to connect to the charging inlet 1110 for recharging the battery pack 1106 include home electrical outlets, external generators, and the like. The mating plug connector 1112 is coupled to the charging station 1104 via an electrical power cable 1114. The thermal sensing system 100 may be installed on the charging inlet 1110 to monitor a temperature within the charging inlet 1110 during a charging operation.

Figure 15:
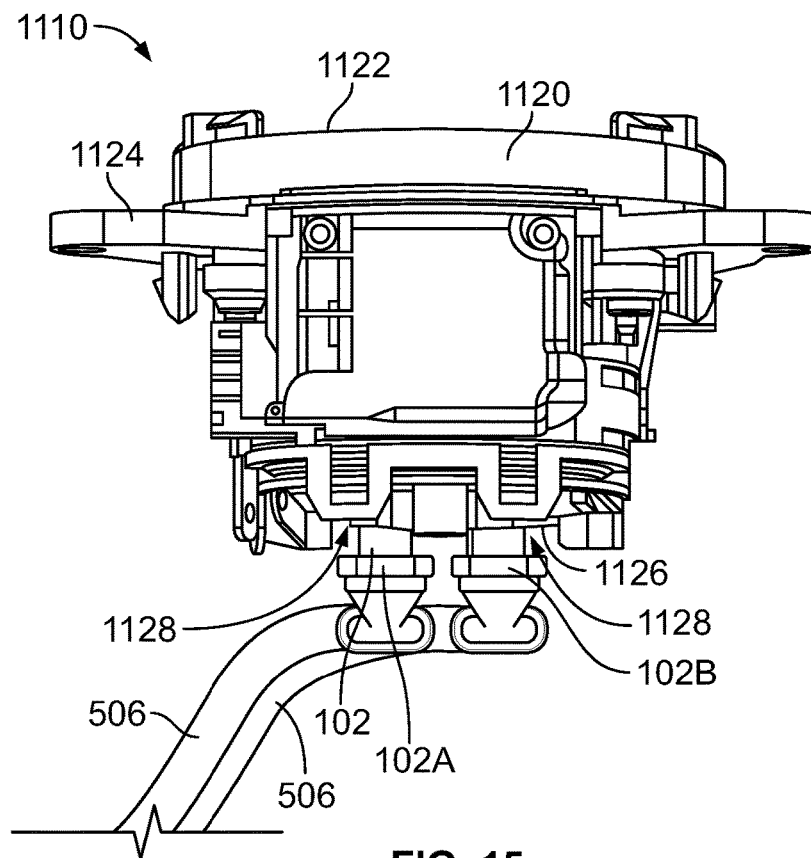
FIG. 15 is a top down view of a charging inlet of the electric vehicle shown in FIG. 14 according to an embodiment.

Additional reference is made to FIG. 15, which is a top down view of the charging inlet 1110 according to an embodiment. The charging inlet 1110 includes a housing 1120 and two electrical contacts 102 held by the housing 1120. Either or both of the electrical contacts 102 may represent a portion of the thermal sensing system 100 described herein. The housing 1120 has a mating side 1122 with an interface that releasably couples to the mating plug connector 1112 to establish an electrical connection for conducting current from the charging station 1104 to the battery pack 1106. For example, the plug connector 1112 may include multiple mating contacts 112 (shown in FIG. 1) that are configured to engage the electrical contacts 102 at mating interfaces to establish a conductive path for current transfer across the mating interface. The charging inlet 1110 may have a locking device (not shown) that releasably secures the mating plug connector 1112 in a mated position with the charging inlet 1110 to prevent premature disconnection of the mating plug connector 1112 from the charging inlet 1110. The housing 1120 optionally may include a flange 1124 that is used for mounting the charging inlet 1110 to the vehicle 1102, such as to a body panel or chassis of the vehicle 1102.

The housing 1120 of the charging inlet 1110 extends from the mating side 1122 to a back side 1126 that is opposite the mating side 1122. The two electrical contacts 102A, 102B are held spaced apart from each other. The contacts 102A, 102B project into corresponding contact channels 1128 of the housing 1120 from the back side 1126. The electrical cables 506 that are terminated to the electrical contacts 102 (as shown in FIG. 5) are disposed outside of the housing 1120. The electrical cables 506 in the illustrated embodiment are power cables that extend from the electrical contacts 102 to the battery pack 1106 to convey electric current for charging the battery pack 1106. The electric current conveyed along the electrical contacts 102 and the cables 506 may be relatively high power (e.g., high voltage and/or current). For example, the electrical contacts 102 may be direct current (DC) fast charge terminals for conveying DC current at rates up to or exceeding 500 A and high voltages up to or exceeding 1000 V. Although not shown, the charging inlet 1110 may also include other electrical contacts held by the housing 1120 in addition to the two electrical contacts 102, such as contacts that convey alternating current (AC) at reduced power levels relative to the power levels conveyed by the electrical contacts 102. The charging inlet 1110 may include a cover 1130 (shown in FIG. 16) that removably couples to the housing 1120 and encloses the electrical contacts 102. The cover 1130 is not shown in FIG. 15.

Figure 16:
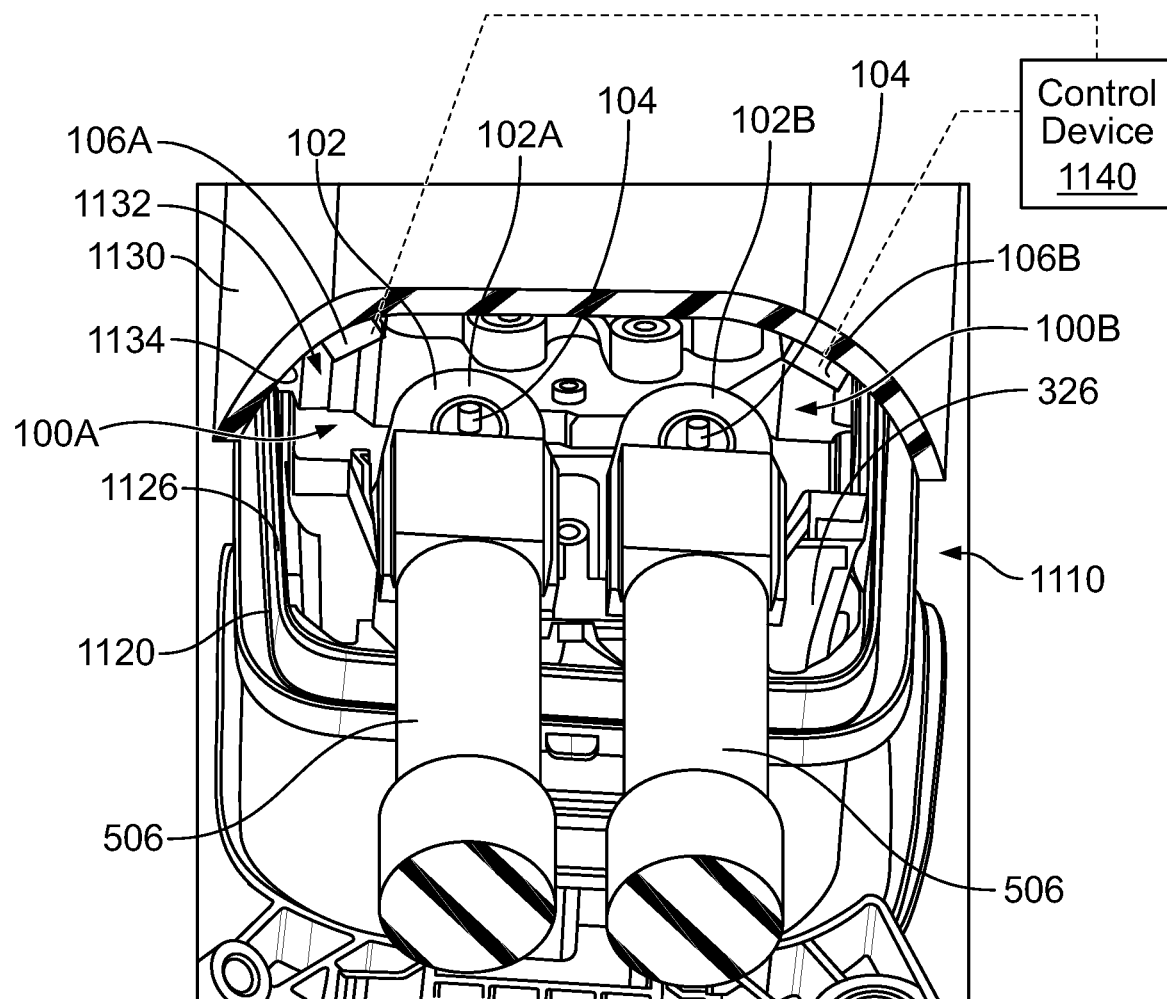
FIG. 16 is a bottom perspective view of a portion of the charging inlet according to an embodiment.

FIG. 16 is a bottom perspective view of a portion of the charging inlet 1110 according to an embodiment. The perspective view shows the back side 1126 of the housing 1120. The cover 1130 is mounted onto the housing 1120 to define a cavity 1132 between the cover 1130 and the back side 1126 of the housing 1120. The cover 1130 is shown in cross-section in FIG. 16 for descriptive purposes to show the electrical contacts 102 that are enclosed within the cavity 1132. The cables 506 may extend through one or more outlet openings (not shown) in the cover 1130 to exit the cavity 1132.

The thermal sensing system 100 may be installed on the charging inlet 1110 to monitor the temperature of at least one of the electrical contacts 102 within the charging inlet 1110. In the illustrated embodiment, the charging inlet 1110 has two thermal sensing systems 100 including a first thermal sensing system 100A to monitor the temperature of the first electrical contact 102A and a second thermal sensing system 100B to monitor the temperature of the second electrical contact 102B. The first thermal sensing system 100A includes the first electrical contact 102A, the sensing element 104 coupled to the first electrical contact 102A, and a first position sensor 106A. The second thermal sensing system 100B includes the second electrical contact 102B, the sensing element 104 coupled to the second electrical contact 102B, and a second position sensor 106B.

The first and second position sensors 106A, 106B are mounted to an inner surface 1134 of the cover 1130 in the illustrated embodiment. The placement of the first position sensor 106A allows the first position sensor 106A to detect a position change of the sensing element 104 on the first contact 102A that is attributable to a temperature increase of the first contact 102A that exceeds a designated threshold. Likewise, the placement of the second position sensor 106B allows the second position sensor 106B to detect a position change of the sensing element 104 on the second contact 102B attributable to a temperature increase of the second contact 102. In an alternative embodiment, the position sensors 106A, 106B may be mounted to the housing 1120 or to another component within the cavity 1132, such as a secondary lock.

The first and second position sensors 106A, 106B are operably connected to a control device 1140 that includes one or more processors. The control device 1140 may be a component of the electric vehicle 1102 (shown in FIG. 14) or a component of the external power source (e.g., the charging station 1104). Each of the position sensors 106A, 106B may be configured to generate position data that is communicated to the control device 1140 via a wired or wireless path. The position data indicates whether the respective position sensor 106 detects a position change of the corresponding sensing element 104 from a first position to a second position. The control device 1140 analyzes (e.g., processes) the position data received by the position sensors 106A, 106B. Upon receipt of position data indicating the position change of the sensing element 104 on the first contact 102A from the first position to the second position, the control device 1140 may determine that the temperature of the first contact 102A exceeds a designated threshold temperature. The control device 1140 may make a similar determination regarding the second contact 102B upon receiving position data indicating a position change of the sensing element 104 on the second contact 102B.

Upon determining that the temperature of at least one of the electrical contacts 102A, 102B exceeds a designated threshold temperature, the control device 1140 may be programmed to automatically take one or more actions. For example, the control device 1140 may generate and communicate a control signal configured to reduce a rate of current transfer across the mating interface between the electrical contacts 102A, 102B and the corresponding mating contacts 112 (shown in FIG. 1) of the mating connector 1112 (FIG. 14). The rate of current transfer may be reduced to a non-zero rate or may be reduced to zero such that the current transfer ceases. The reduction in current transfer rate decreases the heat generated by resistances, which may allow the electrical contacts 102A, 102B to cool below the designated threshold temperature. Optionally, the control device 1140 may be configured to take different or additional predetermined actions in response to determining that the temperature of at least one of the electrical contacts 102A, 102B exceeds a designated threshold temperature. For example, the control device 1140 may generate and communicate a control signal configured to notify a human operator of the excess temperature within the charging inlet 1110, to store a record of the event in a log, or the like.

Figure 17:
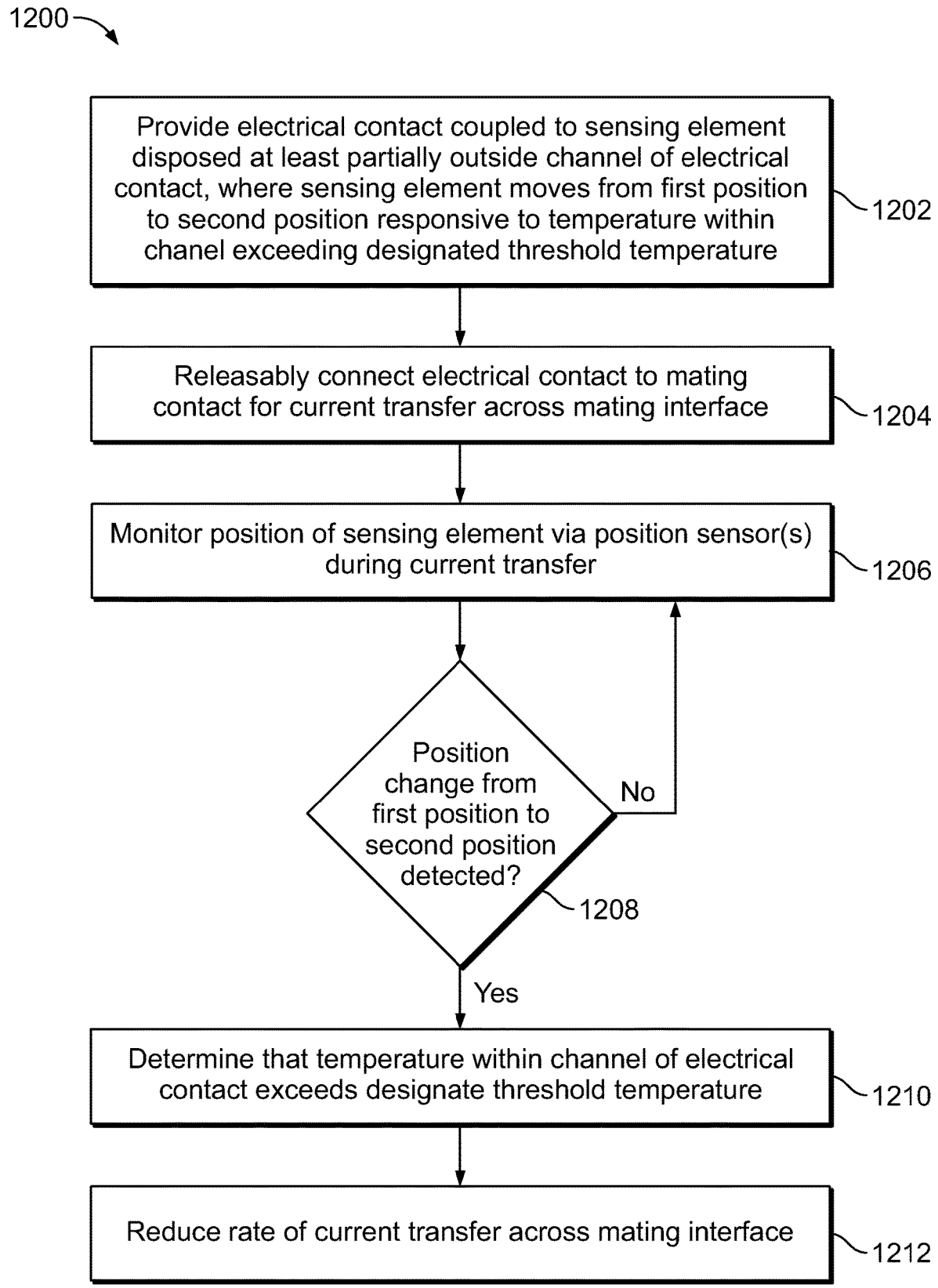
FIG. 17 is a flow chart of a method for sensing a temperature of an electrical contact according to an embodiment of the present disclosure.

FIG. 17 is a flow chart of a method 1200 for sensing a temperature of an electrical contact 102 according to an embodiment of the present disclosure. The method 1200 may be performed using the thermal sensing system 100 according to the embodiments described herein. Referring to FIGS. 1-16, the method 1200 begins at 1202, at which an electrical contact 102 is provided. The electrical contact 102 defines a channel 136 therein, and is coupled to a sensing element 104 which is disposed at least partially outside of an opening 138 of the channel 136. The sensing element 104 is configured to move relative to the electrical contact 102 from a first position to a second position based on a temperature within the channel 136 of the electrical contact 102. For example, the sensing element 104 may only achieve the second position in response to a temperature increase within the channel 136 that exceeds a designated threshold temperature. The electrical contact 102 may be, but is not limited to, a component of a charging inlet 1110 of an electric vehicle 1102.

At 1204, the electrical contact 102 is releasably connected to a mating contact 112 at a mating interface to establish a conductive path for current transfer across the mating interface. For example, the current transfer may be, but is not limited to, charging current that for charging a battery pack 1106 of an electric vehicle 1102. The transfer of current across the mating interface may generate heat due to electrical resistances of the materials and interfaces. The heat that is generated may increase the temperature of the electrical contact 102.

At 1206, the position of the sensing element 104 is monitored by at least one position sensor 106 during the current transfer across the mating interface. The position sensor(s) 106 may be any type of sensor that is able to detect a position change of the sensing element 104 relative to the electrical contact 102. For example, the position sensor(s) 106 may be an optocoupler, a Hall effect sensor, a capacitive displacement sensor, an ultrasonic transducer, an optical proximity sensor, or the like. In at least one embodiment, the position sensor(s) 106 may be a temperature sensor that detects the position of the sensing element 104 based on a temperature gradient. The first and second positions of the sensing element 104 may be predetermined and designated positions.

At 1208, it is determined whether a position change of the sensing element 104 from the first position to the second position is detected by the position sensor(s) 106. The position change of the sensing element 104 may include elongating of the sensing element 104 or other movement of the sensing element 104 in a direction away from the channel 136. Alternatively, the position change may comprise twisting or rotation of the sensing element 104 or bending of the sensing element 104 relative to the electrical contact 102. The position sensor(s) 106 may detect the position change by monitoring an exterior segment of the sensing element 104 that is outside of the channel 136, or monitoring an indicator flag 808 that is attached to the exterior segment of the sensing element 104. If the position change of the sensing element 104 from the first position to the second position is not detected, then flow of the method 1200 returns to 1206 and the position sensor(s) 106 continue to monitor the position of the sensing element 104. If, on the other hand, the position change of the sensing element 104 from the first position to the second position is detected, then flow proceeds to 1210.

At 1210, it is determined that the temperature within the channel 136 of the electrical contact 102 exceeds a designated threshold temperature. For example, the sensing element 104 may be calibrated with the temperature such that the sensing element 104 only achieves the position change from the first position to the second position in response to the temperature within the channel 136 exceeding the designated threshold temperature. If the temperature within the channel 136 is less than the designated threshold temperature, then the sensing element 104 is not in the second position. Conversely, if the temperature within the channel 136 is greater than the designated threshold temperature, then the sensing element 104 is configured to be in the second position. Therefore, detection of the sensing element 104 being in the second position indicates that the temperature within the channel 136 exceeds the designated threshold temperature. The designated threshold temperature optionally may represent an upper limit of a safe operating temperature, such that temperatures in excess of the designated threshold temperature may risk damage to the device that houses the electrical contact 102 (e.g., the charging inlet 1110) and/or associated components and circuitry.

At 1212, after determining that the temperature within the channel 136 of the electrical contact 102 exceeds a designated threshold temperature, the rate of current transfer across the mating interface between the electrical contact 102 and the mating contact 112 is reduced. For example, the rate of current transfer may be reduced to a non-zero rate or may be entirely reduced to cease additional current transfer, at least until the temperature of the electrical contact 102 is less than the designated threshold temperature. Reducing the current transfer rate may reduce the risk of heat-related damage and/or fire during the charging operation. Optionally, the reduction in the rate of current transfer may be controlled by a control device 1140 that communicates with the position sensor(s) 106 via a wired or wireless connection.

In a first non-limiting example embodiment, providing the electrical contact 102 at 1202 includes filling the channel 136 of the electrical contact 102 with a working material 302 that has a temperature-dependent expansive property. The working material 302 forces the sensing element 104 to move in a direction away from the channel 136 in response to the temperature increase within the channel 136. The working material 302 may be only in a vapor phase, in both a liquid and a vapor phase, and/or in both a solid and a liquid phase throughout an operating temperature range of the electrical contact 102. For example, the working material 302 may be an incompressible wax that changes from a solid to a liquid when the temperature exceeds the designated threshold temperature, causing the sensing element 104 to move from the first position to the second position.

In a second non-limiting example embodiment, providing the electrical contact 102 at 1202 includes loading a tube 304 into the channel 136 of the electrical contact 102. The tube 304 is mechanically coupled to the sensing element 104 to define a sealed chamber 305 that contains a working material 302 having a temperature-dependent expansive property. The working material 302 forces the sensing element 104 to move in a direction away from the channel 136 in response to the temperature increase within the channel 136. The sensing element 104 may be an expansion tip 306 resembling a bellows, a plunger 602, or the like.

In a third non-limiting example embodiment, providing the electrical contact 102 at 1202 includes loading a tube 952 into the channel 136 of the electrical contact 102 such that an exterior end 956 of the tube 952 is outside of the channel 136. The tube 952 contains a working material 302 that has a temperature-dependent expansive property and a noncondensable gas 950 that represents the sensing element 104. Furthermore, the position sensor(s) 106 may monitor the position of the noncondensable gas 950 at 1206 to detect the position change of the noncondensable gas 950 by measuring a temperature of the tube 952 at one or more axial locations outside of the channel 136. For example, the position sensor(s) 106 may be temperature sensor(s) 964. The thermal sensing system 100 may have multiple temperature sensors 964 spaced apart along the length of an exterior segment of the tube 952 outside of the channel 136.

In a fourth non-limiting example embodiment, providing the electrical contact 102 at 1202 includes loading the sensing element 104 into the channel 136 of the electrical contact 102 such that an interior segment 804 of the sensing element 104 is within the channel 136 and an exterior segment 806 of the sensing element 104 is outside of the channel 136. The sensing element 104 comprises a bimetallic strip 902 or a shape memory alloy wire 810. The exterior segment 806 of the bimetallic strip 902 or shape memory alloy wire 810 moves relative to the electrical contact 102 responsive to a temperature change of the interior segment 804 within the channel 136.

As used herein, relative or spatial terms such as "front," "rear," "top," "bottom," "interior," and "exterior" are only used to identify and distinguish the referenced elements in the orientations shown in the figures and do not necessarily require particular positions or orientations relative to gravity and/or the surrounding environment of the thermal sensing system 100.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A thermal sensing system comprising:
an electrical contact including a shaft that defines a channel, the channel extending into the shaft from an opening along an outer surface of the shaft;
a sensing element disposed at least partially outside of the channel and operably connected to the channel through the opening, the sensing element being movable relative to the electrical contact based on a temperature change within the channel; and
a position sensor spaced apart from the electrical contact and the sensing element, the position sensor configured to detect a position change of a portion of the sensing element outside of the channel responsive to the temperature change within the channel.

2. The thermal sensing system of claim 1, wherein the electrical contact is a power terminal of a charging inlet for an electrical vehicle.

3. The thermal sensing system of claim 1, wherein the shaft is elongated from a mounting end of the shaft to a mating end of the shaft that is opposite the mounting end, wherein the opening of the channel is located at the mounting end and the channel longitudinally extends towards the mating end to a closed end of the channel.

4. The thermal sensing system of claim 3, wherein the sensing element protrudes through the opening of the shaft and projects beyond the mounting end of the shaft.

5. The thermal sensing system of claim 1, wherein the sensing element is a bimetallic strip that protrudes through the opening and has an exterior segment disposed outside of the channel, the bimetallic strip including a first metal layer and a second metal layer that is fixed relative to the first metal layer, the first metal layer having a different coefficient of expansion than the second metal layer such that the exterior segment moves relative to the electrical contact in response to a temperature change of the bimetallic strip.

6. The thermal sensing system of claim 1, wherein the sensing element is a wire comprising a shape memory alloy, the wire protruding through the opening and having an exterior segment outside of the channel, wherein the exterior segment of the wire moves from a first preset position to a second preset position in response to a temperature of the wire crossing a transition temperature of the wire.

7. The thermal sensing system of claim 1, further comprising a working material within the channel of the shaft, the working material having a temperature-dependent expansive property, wherein the working material forces the sensing element to move in a direction away from the channel in response to a temperature increase within the channel.

8. The thermal sensing system of claim 7, wherein the working material within the channel is in a gas phase and has a boiling point below an operating temperature range of the electrical contact.

9. The thermal sensing system of claim 7, wherein the working material within the channel is a saturated liquid and vapor mixture that has a boiling point within an operating temperature range of the electrical contact.

10. The thermal sensing system of claim 7, wherein the working material is an alcohol.

11. The thermal sensing system of claim 7, wherein the working material is a wax that has a melting point within an operating temperature range of the electrical contact.

12. The thermal sensing system of claim 7, wherein the sensing element is a plunger that projects through the opening of the channel, wherein the working material impinges upon an interior end of the plunger that is within the channel and forces the interior end to move towards the opening in response to the temperature increase within the channel.

13. The thermal sensing system of claim 1, further comprising a tube disposed at least partially within the channel and mechanically coupled to the sensing element, wherein the tube contains a working material that varies a force exerted on the sensing element based on a temperature change of the working material within the tube.

14. The thermal sensing system of claim 13, wherein the sensing element is an expansion tip having an end wall and one or more pleated side walls between the end wall and the tube, wherein the one or more pleated side walls are configured to longitudinally expand and contract based on the force exerted by the working material.

15. The thermal sensing system of claim 1, wherein the position sensor is an optical proximity sensor.

16. A thermal sensing system comprising:
an electrical contact including a shaft that defines a channel, the channel extending into the shaft from an opening along an outer surface of the shaft;
a sensing element disposed at least partially outside of the channel and operably connected to the channel through the opening, the sensing element being movable relative to the electrical contact; and
a working material that is discrete from the shaft and disposed within the channel of the shaft, the working material having a temperature-dependent expansive property, wherein the working material exerts a force on the sensing element to move the sensing element in a direction away from the channel in response to a temperature increase within the channel.

17. The thermal sensing system of claim 16, further comprising a tube disposed at least partially within the channel, the tube having a closed end and an open end opposite the closed end, wherein the sensing element is an expansion tip that is mechanically coupled to the open end of the tube to enclose the working material within the tube and the expansion tip, the expansion tip having an end wall and one or more pleated side walls between the end wall and the tube.

18. The thermal sensing system of claim 16, wherein the sensing element is a plunger that projects through the opening of the channel, and the thermal sensing system further comprises an annular seal that radially extends between an outer surface of the plunger and an interior surface of the shaft to seal the working material within the channel.

19. The thermal sensing system of claim 16, further comprising a position sensor spaced apart from the electrical contact and the sensing element, the position sensor configured to detect a position change of the sensing element relative to the electrical contact attributable to the force exerted on the sensing element by the working material.

20. A thermal sensing system comprising:
an electrical contact including a shaft, the shaft defining a channel that extends into the shaft from an opening along an outer surface of the shaft;
a metallic sensing element protruding through the opening, the metallic sensing element having an interior segment disposed within the channel and an exterior segment disposed outside of the channel, wherein the exterior segment moves relative to the electrical contact from a first position to a second position in response to a temperature of the interior segment of the metallic sensing element exceeding a designated threshold temperature; and
a position sensor spaced apart from the electrical contact and the metallic sensing element, the position sensor configured to detect a position change of the exterior segment of the metallic sensing element from the first position to the second position.

21. The thermal sensing system of claim 20, wherein the metallic sensing element includes a first metal layer fixed to a second metal layer in a stacked configuration, the first metal layer having a different coefficient of expansion than the second metal layer.

22. The thermal sensing system of claim 20, wherein the metallic sensing element is a wire comprising a shape memory alloy and the first and second positions of the exterior segment are preset positions.

23. The thermal sensing system of claim 20, wherein the exterior segment of the metallic sensing element outside of the channel is attached to an indicator flag.

* * * * *